United States Defensive Publication [19] (H) [11] T971,008

Hansen [43] June 6, 1978

[54] FOXING PRIMER

[75] Inventor: David R. Hansen, Houston, Tex.

[73] Assignee: Shell Oil Company

[21] Appl. No.: 816,788

[22] Filed: Jul. 18, 1977

[51] Int. Cl.[2] ..... B32B 25/00; D03D 1/00

[52] U.S. Cl. ..... 428/266; 428/265; 428/267; 428/274; 428/290; 428/447; 428/451; 428/519; 428/521; 428/264

[57] ABSTRACT

An improved footwear assembly is disclosed comprising a textile upper, a polymeric soling and a foxing wherein the foxing comprises a monoalkenyl arene-conjugated diene block copolymer. The improvement lies in coating at least the area of the upper which is contacted with the foxing with a silane compound containing at least one functional group. These functional groups include halogens, alkoxy groups, alkyl amines, methacryloxypropyl groups, alkyl mercapto groups, alkyloxy epoxy radicals and mixtures thereof. Preferably, both the foxing and polymeric soling are formed from compositions containing styrene-butadiene block copolymers.

5 Claims, No Sheets Drawing,

9 Pages Specification

The file of this unexamined application may be inspected and copies thereof may be purchased (849 O.G. 1221, Apr. 9, 1968).